July 25, 1933.  W. R. GALLAGHER, JR., ET AL  1,919,326

ACCESSORY FOR AUTOMOBILES

Filed April 3, 1933

INVENTORS

William R. Gallagher, Jr.
and W. Leroy Lloyd
BY
Augustus B. Stoughton
ATTORNEY.

WITNESS:

Patented July 25, 1933

1,919,326

UNITED STATES PATENT OFFICE

WILLIAM R. GALLAGHER, JR. AND WILLIAM LE ROY LLOYD, OF HOUTZDALE, PENNSYLVANIA

ACCESSORY FOR AUTOMOBILES

Application filed April 3, 1933. Serial No. 664,056.

Automobiles, more particularly those of the enclosed type, are sometimes fitted with a rear view mirror which is usually unframed and supported by a bracket at an inclination which causes one corner to project in such a way that passengers not infrequently hit their heads on the corner.

The object of the present invention is two-fold, first, it protects the passengers from injury should their heads strike the projecting corner of the mirror, and second, it affords an advertising or card holding medium.

Generally stated, the invention consists in a rubber or like disc having on its face a circular countersunk panel circumscribed by an upstanding undercut circular rim and provided internally with a quadrant shaped notch extending from near its center through its rim; the rim, if preferred, simulating an automobile tire and the undercut portion serving to hold circular or other shaped advertising or memorandum cards.

The invention also comprises the improvements to be presently described and finally claimed.

In the following description reference will be made to the accompanying drawing forming part hereof and in which Figure 1 is a front view showing our invention in application to a mirror.

Figure 1:
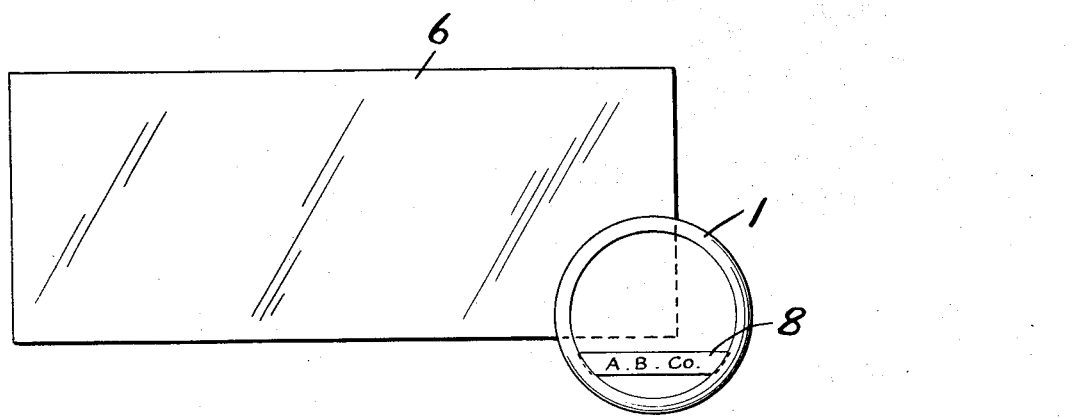

In the drawing, 1 is a disc of rubber or like material. 2 is a countersunk circular panel on the face of the disc 1. The panel 2 is circumscribed by an upstanding circular rim 3 undercut as at 4. 5 is a quadrant shaped notch extending from near the center of the disc through its rim.

In use the corner of a rear vision mirror 6 is inserted into the notch 5 which, by reason of its shape and of the character of the material forming the disc 1, holds the disc firmly in place on the corner of the mirror in position for protecting the heads of passengers.

Figures 2, 3:
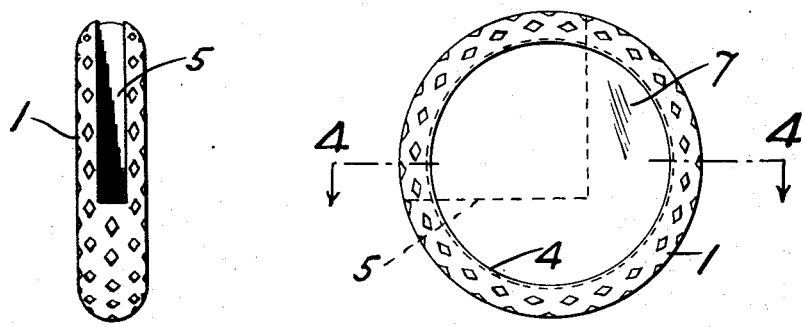
Fig. 2 is a similar view of a device embodying features of the invention.
Fig. 3 is a side view.
Figure 4:
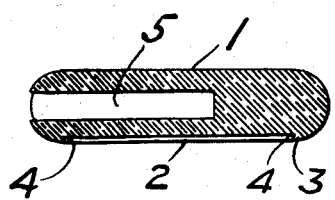
Fig. 4 is a section on the line 4—4 of Fig. 2.

For advertising purposes the rim 3 may stimulate an automobile tire, as shown in the drawing, and the undercut portion 4, of the rim may be used to hold an advertising disc 7, Fig. 2, as of celluloid, which may relate to the tire simulated by the rim, or it may be used to hold a generally rectangular card 8 bearing records as of mileage or gasolene consumption or the like. In the case of rectangular cards, their insertion and removal are easy if their length is less than the diameter of the undercut portion of the disc.

We claim:

1. A corner protector for rear vision automobile mirrors consisting of a rubber or like disc having on its face a circular countersunk panel circumscribed by an upstanding undercut circular rim and provided internally with a quadrant shaped notch extening from near its center portion through the rim portion.

2. A corner protector for rear vision autobile mirrors consisting of a rubber or like disc having on its face a circular countersunk panel circumscribed by an upstanding undercut circular rim and provided internally with a quadrant shaped notch extending from near its center portion through the rim portion in combination with a disc detachably engaged by the undercut portion of the rim.

3. A corner protector for rear vision automobile mirrors consisting of a rubber or like disc having on its face a circular countersunk panel circumscribed by an upstanding undercut circular rim and provided internally with a quadrant shaped notch extending from near its center portion through the rim portion in combination with a generally rectangular card detachably engaged by the undercut portion of the rim.

WILLIAM R. GALLAGHER, JR.
W. LE ROY LLOYD.